(12) United States Patent
Suzuki (10) Patent No.: US 7,415,380 B2
(45) Date of Patent: Aug. 19, 2008

(54) FALL DETECTION DEVICE

(75) Inventor: Takeharu Suzuki, Tokyo (JP)

(73) Assignee: Oki Electric Industry Co., Ltd., Tokyo (JP)

(*) Notice: Subject to any disclaimer, the term of this patent is extended or adjusted under 35 U.S.C. 154(b) by 0 days.

(21) Appl. No.: 11/652,121

(22) Filed: Jan. 11, 2007

(65) Prior Publication Data

US 2007/0225947 A1 Sep. 27, 2007

(30) Foreign Application Priority Data

Mar. 27, 2006 (JP) ............................. 2006-084787

(51) Int. Cl.
*G06F 19/00* (2006.01)

(52) U.S. Cl. ..................................................... 702/142

(58) Field of Classification Search .................. 702/142
See application file for complete search history.

(56) References Cited

U.S. PATENT DOCUMENTS

2005/0141127 A1* 6/2005 Shimotono et al. ............ 360/75

FOREIGN PATENT DOCUMENTS

| JP | 2000-162235 | 6/2000 |
| JP | 2005-37300 | 2/2005 |

* cited by examiner

*Primary Examiner*—Tung S Lau
(74) *Attorney, Agent, or Firm*—Kubotera & Associates, LLC (57) ABSTRACT

In a fall detection device, when a first composite vector value of a first acceleration component obtained from a three-axial acceleration sensor is greater than a rotating fall determining value, or smaller than a free fall determining value, a possibility of a fall is determined. When a second composite vector value of a second acceleration component obtained after a determining time interval is greater than the rotating fall determining value, and an angular difference of each testing surface is greater than an angular difference determining value, it is determined to be in the middle of a fall. Further, when a third composite vector value of a third acceleration component obtained one more time is smaller than the free fall determining value, it is determined to be in the middle of a fall.

4 Claims, 8 Drawing Sheets

FIG. 8 ically with each other. When each of the acceleration components in the three axes detected by the three-axial acceleration sensor changes from a static state and all of the acceleration components become below a threshold value (one third of gravitational acceleration), it is determined that an object is under a free fall state (refer to Patent Reference 1).
FALL DETECTION DEVICE

BACKGROUND OF THE INVENTION AND RELATED ART STATEMENT

The present invention relates to a fall detection device with a three-axial acceleration sensor for detecting a fall.

Recently, a dimension of a hard disk device has been reduced while a capacity thereof has been increased. Accordingly, various types of mobile devices such as a cellular phone are provided with hard disk devices. When a mobile device is provided with a hard disk device having relatively low impact resistance, it is necessary to protect information stored in the hard disk device from an impact of a fall, so that the information is prevented from being damaged. To this end, it has been tried to detect a fall of a mobile device, so that a magnetic head is retracted from a magnetic disk of a hard disk device.

A conventional fall detection device is provided with a three-axial acceleration sensor for detecting acceleration components in three axes crossing perpendicularly with each other. When each of the acceleration components in the three axes detected by the three-axial acceleration sensor changes from a static state and all of the acceleration components become below a threshold value (one third of gravitational acceleration), it is determined that an object is under a free fall state (refer to Patent Reference 1).

In the free fall state, the three-axial acceleration sensor is under a zero gravity state, and the acceleration components in three axes become zero. When an object having a fall detection device falls while rotating (rotating fall), an acceleration component in one axis away from a rotational axis is detected due to a centrifugal force accompanied with the rotation. When the acceleration component does not become below the threshold value, it is difficult to accurately detect a fall even though the object is actually falling. Accordingly, information stored in a hard disk device in a mobile device may be damaged, thereby lowering reliability of fall detection.

In order to detect the rotating fall, a conventional fall detection device is provided with a pair of crossing electrodes arranged on an X-axis and a Y-axis, and a weight is disposed at an origin of the X-axis and the Y-axis. Then, while rotating, alternate current signals having phases inverted with each other are applied to a pair of the crossing electrodes on the X-axis, respectively. Further, alternate current signals having phases inverted with each other and shifted by 90 degrees from those of the alternate current signals applied to the X-axis are applied to a pair of the crossing electrodes on the Y-axis, respectively.

A pair of the crossing electrodes on the Y-axis detects mechanical deformation due to Coriolis force in the Y-axis direction at a node of the alternate current signals applied to the X-axis, so that angular velocities around the Y-axis and the Z-axis are detected. A pair of the crossing electrodes on the X-axis detects mechanical deformation due to Coriolis force in the X-axis direction at a node of the alternate current signals applied to the Y-axis, so that angular velocities around the X-axis and the Z-axis are detected.

Further, a voltage detection device detects a voltage component overlapped on the alternate current signals applied to each of the axes, so that an acceleration component in each of the axes is detected. Accordingly, it is possible to detect the angular velocity around each of the axes and the acceleration component in each of the axes (refer to Patent Reference 2).

Patent Reference 1: Japanese Patent Publication No. 2005-37300

Patent Reference 2: Japanese Patent Publication No. 2000-162235

In Patent Reference 2, while rotating, the specific alternate current signals are applied to pairs of the crossing electrodes on the X-axis and the Y-axis, respectively. The angular velocities are detected from the outputs of the X-axis and the Y-axis at the nodes of the alternate current signals applied to the X-axis and the Y-axis. The voltage detection device detects the voltage components overlapped on the detected alternate current signals applied to each of the axes, so that the acceleration component in each of the axes is detected. Accordingly, it is necessary to provide a supply source of the alternate current signals and the voltage detection device in the fall detection device, thereby making a structure of the fall detection device complex and increasing a size of the fall detection device.

A mobile device may rotate in a situation other than the free fall. For example, when a user holds a mobile device in a hand and swings the mobile device (normal telephone operation, showing a display of the mobile device to others, etc.), the mobile device rotates associated with the swing movement. Accordingly, even though it is possible to detect an angular velocity and determine that the mobile device rotates, when it is erroneously determined that the mobile device is under a free fall state even though the mobile device rotates associated with the swing movement, a magnetic head is retracted too frequently. As a result, power consumption increases, and it takes long time to read and write information from and in the hard disk, thereby decreasing a processing speed of the mobile device.

In view of the problems described above, an object of the present invention is to provide a fall detection device with improved reliability having a small size.

Further objects and advantages of the invention will be apparent from the following description of the invention.

SUMMARY OF THE INVENTION

In order to attain the objects described above, according to the present invention, a fall detection device is provided with a three-axial acceleration sensor for detecting acceleration components in three axes crossing perpendicularly with each other, and for outputting acceleration component signals. The fall detection device includes a storage unit for storing a rotating fall determining value to determine a rotating fall upon falling, a determining time interval with which the acceleration component signal is obtained again to determine the rotating fall, and an angular difference determining value upon determining the rotating fall;

a first obtaining unit for obtaining a first acceleration component signal in each of the three axes from the three-axial acceleration sensor;

a first calculating unit for combining the first acceleration component signal in each of the three axes to calculate a first composite vector value;

a first reading unit for reading the rotating fall determining value from the storage unit;

a first comparing unit for comparing the rotating fall determining value with the first composite vector value;

a second reading unit for reading the determining time interval from the storage unit when the first composite vector value is grater than the rotating fall determining value;

a second obtaining unit for obtaining a second acceleration component signal in each of the three axes from the three-axial acceleration sensor after the determining time interval;

a second calculating unit for combining the second acceleration component signal in each of the three axes to calculate a second composite vector value;

a second comparing unit for comparing the rotating fall determining value with the second composite vector value;

a third calculating unit for calculating an angular difference between a first angle of each of testing surfaces calculated from the first acceleration component signal in each of the three axes and a second angle of each of the testing surfaces calculated from the second acceleration component signal in each of the three axes when the second composite vector value is greater than the rotating fall determining value;

a third reading unit for reading the angular difference determining value from the storage unit;

a third comparing unit for comparing the angular difference determining value with the angular difference of each of the testing surfaces; and a determining unit for determining the rotating fall when at least one of the angular differences of the testing surfaces is greater than the angular difference determining value.

In the present invention, it is possible to determine the rotating fall state separated from other movements, so that an erroneous result due to other movements is prevented, thereby improving reliability of the fall detection device. Further, the fall determining device can be formed of a single three-axial acceleration sensor and a microcomputer, thereby decreasing a size of the fall detection device.

DETAILED DESCRIPTION OF PREFERRED EMBODIMENTS

Figure 1:
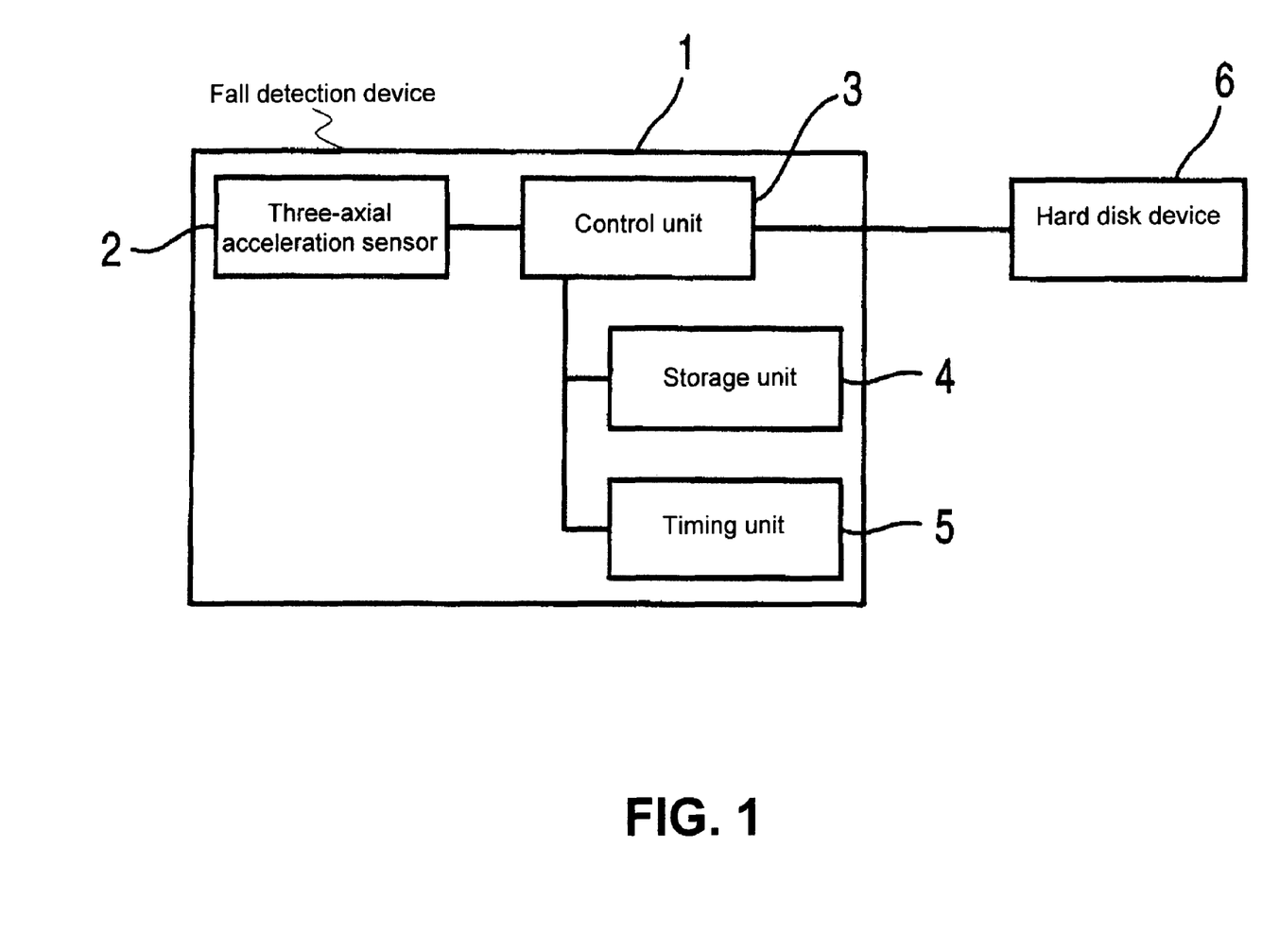
FIG. 1 is a block diagram showing a fall detection device according to an embodiment of the present invention.

Hereunder, embodiments of the present invention will be explained with reference to the accompanying drawings. FIG. 1 is a block diagram showing a fall detection device 1 according to an embodiment of the present invention.

As shown in FIG. 1, the fall detection device 1 is provided with a three-axial acceleration sensor 2. The three-axial acceleration sensor 2 may include a weight portion, a flexible portion arranged along four directions of the weight portion in a cross shape, and a bridge circuit formed of piezo resistance elements and arranged on the flexible portion for converting deformation generated in the flexible portion to an electrical signal. Accordingly, the three-axial acceleration sensor 2 has a function of outputting acceleration components as acceleration component signals in three axes, i.e., an X-axis, a Y-axis, and a Z-axis, crossing perpendicularly with each other.

Further, the fall detection device 1 is provided with a control unit 3 such as a central processing unit installed in a microcomputer. The control unit 3 has functions of obtaining acceleration component signals from the three-axial acceleration sensor 2 and controlling each unit in the fall detection device 1 to execute a fall detection process. Further, the fall detection device 1 is provided with a storage unit 4 such as a storage device installed in a microcomputer. The storage unit 4 stores a program to be executed with the control unit 3, various types of data for the program, and a result processed with the control unit 3.

Further, the fall detection device 1 is provided with a timing unit 5 such as a timer having a frequency generation unit installed in a microcomputer. The timing unit 5 measures a time based on the frequency generated, and outputs the time to the control unit 3. A hard disk device 6 includes a magnetic disk; a magnetic head for reading and writing data on the magnetic disk; and an actuator for moving the magnetic head. The hard disk device 6 has a function of retracting the magnetic head from the magnetic disk with the actuator according to a retraction directing signal sent from the control unit 3.

In the embodiment, the storage unit 4 of the fall detection device 1 stores a fall detecting process program in advance. The fall detection process program has a function of detecting a fall through executing a free fall determining process and a rotating fall determining process. In the free fall determining process, a free fall upon falling is determined according to the acceleration component signals in the three axes from the three-axial acceleration sensor 2. In the rotating fall determining process, a rotating fall is determined.

In the embodiment, the storage unit 4 also stores various threshold values for determining a fall such as a rotating fall determining value to determine a rotating fall upon falling; a free fall determining value to determine a free fall upon falling; a determining time interval with which the acceleration component signal is obtained again to determine the rotating fall; and an angular difference determining value upon determining the rotating fall.

In the embodiment, the rotating fall determining value is set to 1.3 G (G: gravitational acceleration); the free fall determining value is set to 0.1 G; and the angular difference determining value is set to 40 degrees. The determining time interval is set to a sampling time (fore example, 0.1 msec.), i.e., a time interval for watching a fall according to a change in the acceleration component signal obtained from the three-axial acceleration sensor 2.

Figure 2:
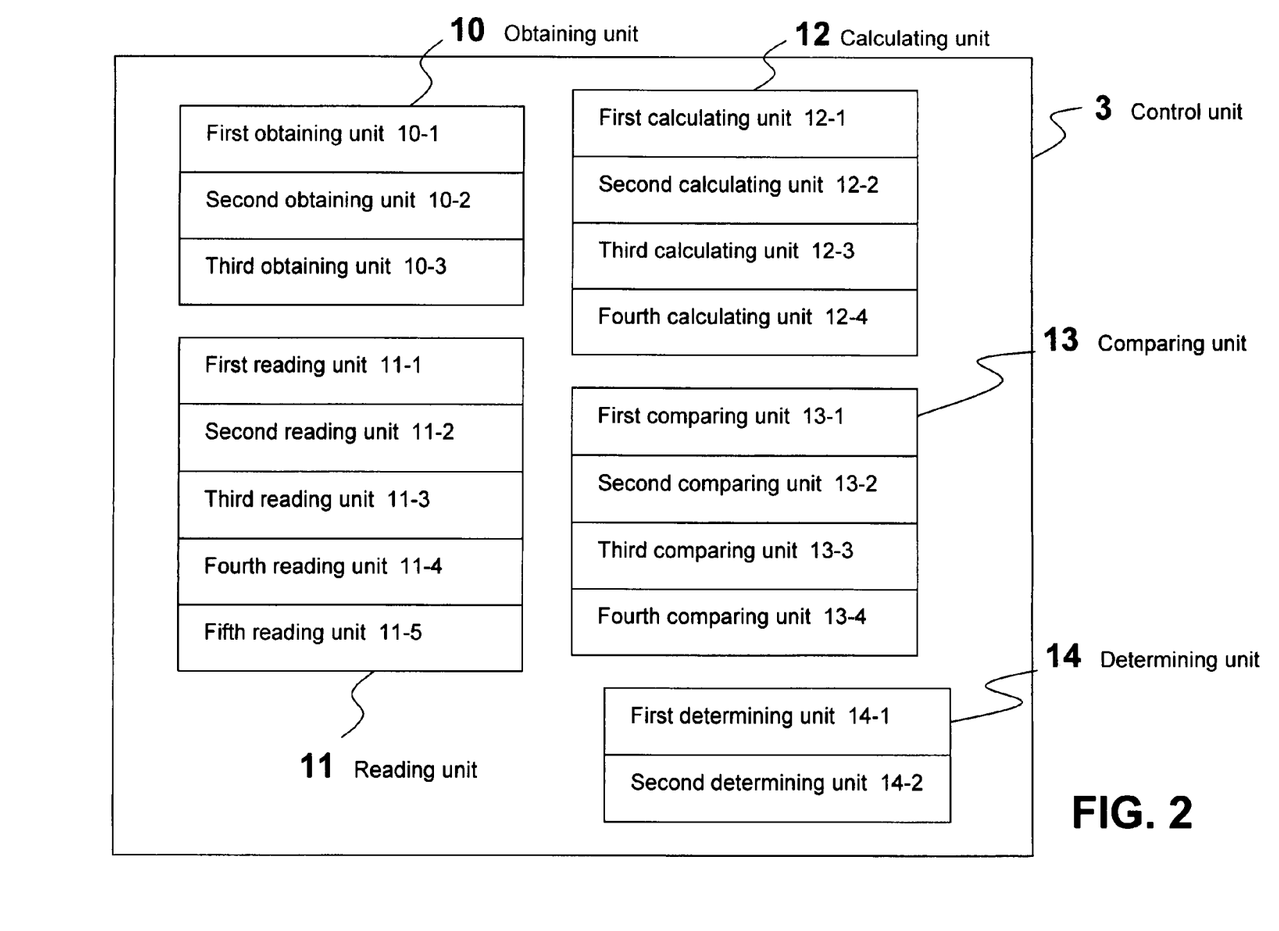
FIG. 2 is a block diagram showing a control unit of the fall detection device according to the embodiment of the present invention.

A configuration of the control unit 3 will be explained next. FIG. 2 is a view showing the configuration of the control unit 3 according to the first embodiment of the present invention.

As shown in FIG. 2, the control unit 3 is formed of an obtaining unit 10; a reading unit 11; a calculating unit 12; a comparing unit 13; and a determining unit 14.

The obtaining unit 10 includes a first obtaining unit 10-1, a second obtaining unit 10-2, and a third obtaining unit 10-3. The obtaining unit 10 has a function of obtaining an acceleration component signal. In particular, the first obtaining unit 10-1 obtains a first acceleration component signal in each of the three axes from the three-axial acceleration sensor 2. The second obtaining unit 10-2 obtains a second acceleration component signal in each of the three axes from the three-axial acceleration sensor 2 after the determining time interval.

The third obtaining unit 10-3 obtains a third acceleration component signal in each of the three axes from the three-axial acceleration sensor 2 after the determining time interval.

The reading unit 11 includes a first reading unit 11-1, a second reading unit 11-2, a third reading unit 11-3, a fourth reading unit 11-4, and a fifth reading unit 11-5, and has a function for reading various values stored in the storage unit 4.

In particular, the first reading unit 11-1 reads the rotating fall determining value from the storage unit 4. The second reading unit 11-2 reads the determining time interval from the storage unit 4 when the first composite vector value is grater than the rotating fall determining value. The third reading unit 11-3 reads the angular difference determining value from the storage unit 4.

Further, the fourth reading unit 11-4 reads the free fall determining value from the storage unit 4. The fifth reading unit 11-5 reads the determining time interval from the storage unit 4 when the first composite vector value is smaller than the free fall determining value.

The calculating unit 12 has a function of performing various calculations, and includes a first calculating unit 12-1; a second calculating unit 12-1; a third calculating unit 12-1; and a fourth calculating unit 12-1. More specifically, the first calculating unit 12-1 combines the first acceleration component signal in each of the three axes to calculate the first composite vector value. The second calculating unit 12-2 combines the second acceleration component signal in each of the three axes to calculate the second composite vector value.

Further, the third calculating unit 12-3 calculates an angular difference between a first angle of each of testing surfaces calculated from the first acceleration component signal in each of the three axes and a second angle of each of the testing surfaces calculated from the second acceleration component signal in each of the three axes when the second composite vector value is greater than the rotating fall determining value. The fourth calculating unit 12-4 combines the third acceleration component signal in each of the three axes to calculate the third composite vector value.

The comparing unit 13 has a function of comparing various values, and includes a first comparing unit 13-1; a second comparing unit 13-2; a third comparing unit 13-3; and a fifth comparing unit 13-4. In particular, the first comparing unit 13-1 compares the rotating fall determining value with the first composite vector value. The second comparing unit 13-2 compares the rotating fall determining value with the second composite vector value. The third comparing unit 13-3 compares the angular difference determining value with the angular difference of each of the testing surfaces. The fourth comparing unit 13-4 compares the free fall determining value with the first composite vector value.

The determining unit 14 has a function of determining one of the free fall and the rotating fall based on various values, and includes a first determining unit 14-1 and a second determining unit 14-1. The first determining unit 14-1 determines the rotating fall when at least one of the angular differences of the testing surfaces is greater than the angular difference determining value. The second determining unit 14-2 determines the free fall when the third composite vector value is smaller than the free fall determining value.

Figure 3:
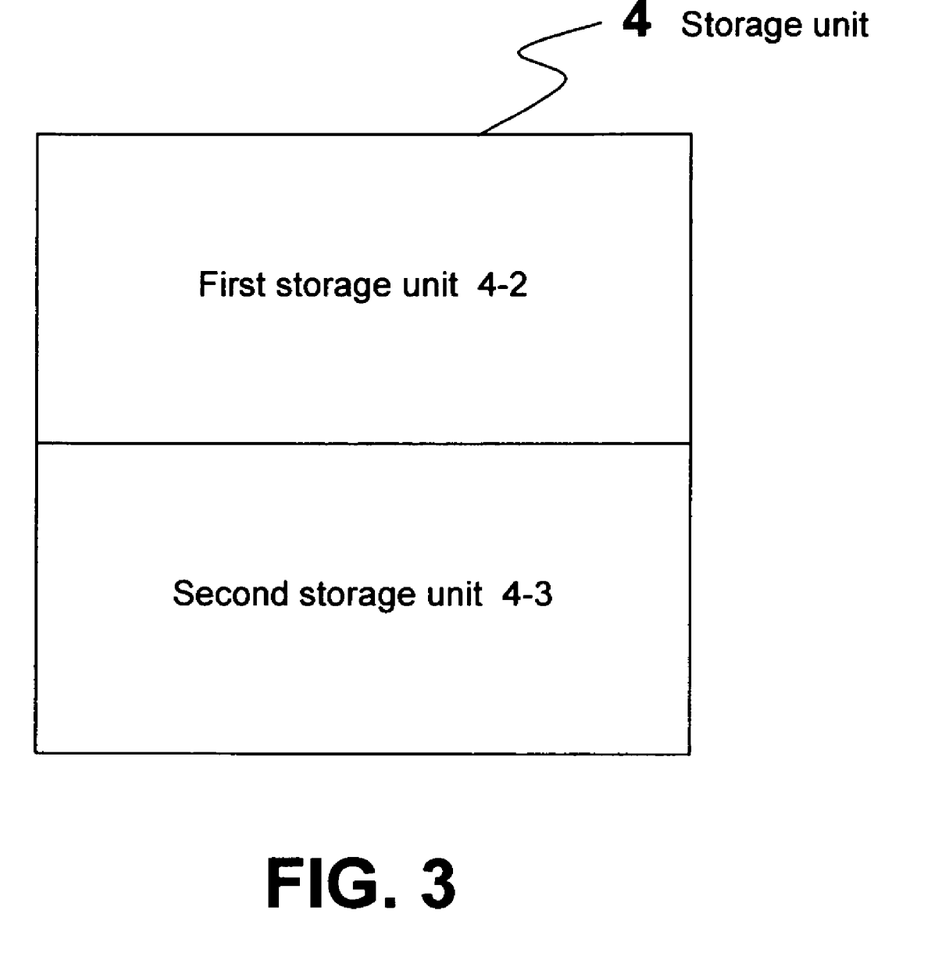
FIG. 3 is a block diagram showing a storage unit of the fall detection device according to the embodiment of the present invention.

A configuration of the storage unit 4 will be explained next. FIG. 3 is a view showing the configuration of the storage unit 4 according to the first embodiment of the present invention.

As shown in FIG. 3, the storage unit 4 includes a first storage unit 4-1 and a second storage unit 4-2. The first storage unit 4-1 stores the rotating fall determining value to determine a rotating fall upon falling, the determining time interval with which the acceleration component signal is obtained again to determine the rotating fall, and the angular difference determining value upon determining the rotating fall. The second storage unit 4-2 stores the free fall determining value to determine the free fall upon falling.

Figure 4:
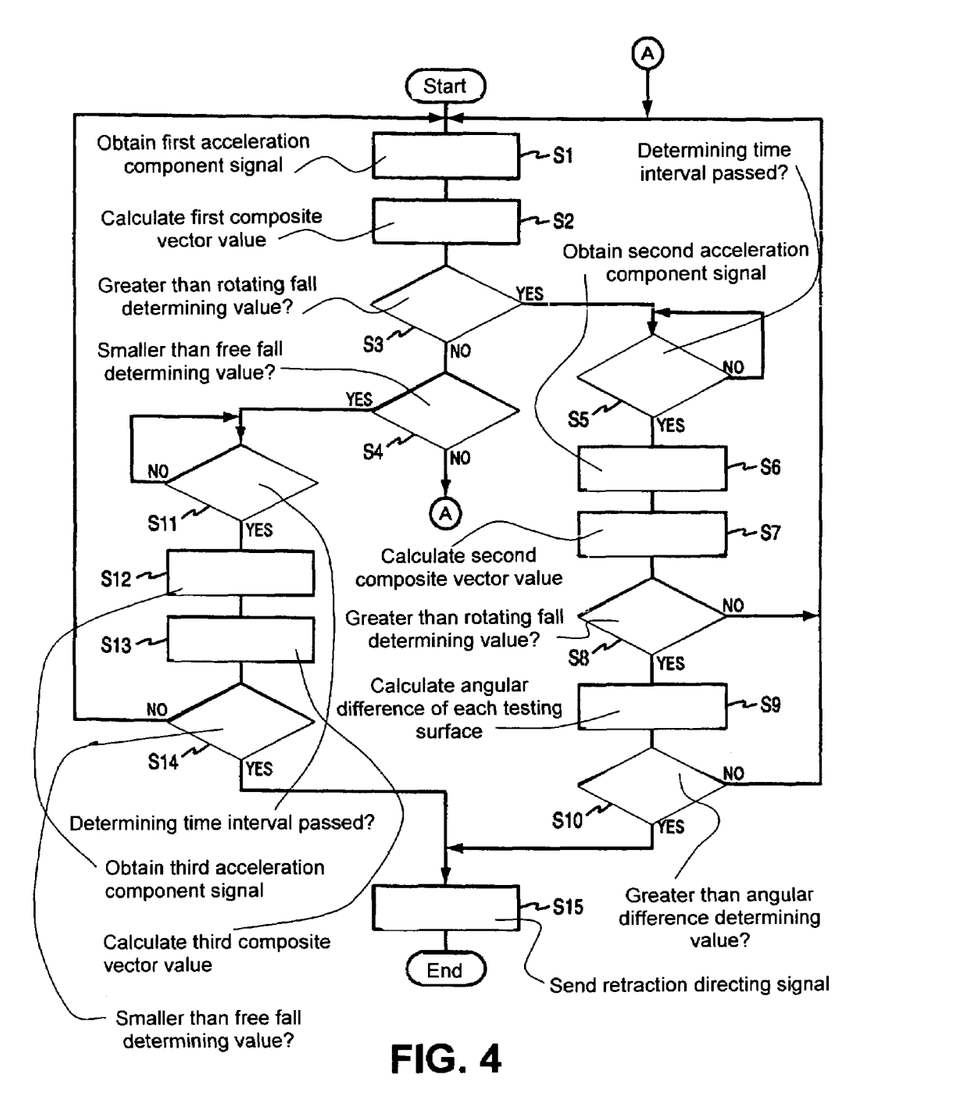
FIG. 4 is a flow chart showing a process of detecting a fall according to the embodiment of the present invention.

With reference to FIG. 4, the fall detection process will be explained next. FIG. 4 is a flow chart showing a process of detecting the fall according to the embodiment of the present invention.

In step S1, when the fall detection process program starts, the control unit 3 of the fall detection device 1 starts waiting in a fall watch time waiting state in which the control unit 3 waits for a sampling time while the timing unit 5 measures a time. When the sampling time arrives, the control unit 3 obtains an acceleration component signal (first acceleration component signal) in each axis from the three-axial acceleration sensor 2.

In step S2, after the control unit 3 obtains the first acceleration component signal in each axis, the control unit 3 retrieves or reads first acceleration components relative to an X-axis direction, a Y-axis direction, and a Z-axis direction from the first acceleration component signal in each axis, and then stores the first acceleration components in the storage unit 4 temporarily. Further, the control unit 3 combines the first acceleration components to calculate a composite vector value (first composite vector value), i.e., a scalar value of an acceleration vector.

In step S3, after the control unit 3 calculates the first composite vector value, the control unit 3 retrieves or obtains the rotating fall determining value stored in the storage unit 4, and compares the rotating fall determining value with the first composite vector value. When the first composite vector value is greater than the rotating fall determining value, it is determined that there is a possibility of a rotating fall. The process proceeds to step S5 for executing the rotating fall determining process. When the first composite vector value is smaller than the rotating fall determining value, the process proceeds to step S4.

In step S4, the control unit 3 retrieves the free fall determining value stored in the storage unit 4, and compares the free fall determining value with the first composite vector value. When the first composite vector value is smaller than the free fall determining value, it is determined that there is a possibility of a free fall. The process proceeds to step S11 for executing the free fall determining process. When the first composite vector value is greater than the free fall determining value, the process returns to step S4 through a connector A, and the control unit 3 waits in the fall watch time waiting state.

In step S5, after the control unit 3 determines that there is a possibility of the rotating fall, the control unit 3 retrieves the determining time interval (in the embodiment, sampling time) stored in the storage unit 4. Then, the control unit 3 waits for a period of the determining time interval while the timing unit 5 measures a lapsed time from when the first acceleration component signal is obtained. After the determining time interval, the process proceeds to step S6. If it is before the determining time interval, the control unit 3 continues waiting.

In step S6, after the determining time interval, the control unit 3 obtains once more an acceleration component signal (second acceleration component signal) in each axis from the three-axial acceleration sensor 2. In step S7, after the control unit 3 obtains the second acceleration component signal in each axis, similar to step S2, the control unit 3 calculates a composite vector value (second composite vector value).

In step S8, after the control unit 3 calculates the second composite vector value, the control unit 3 retrieves the rotating fall determining value stored in the storage unit 4, and compares the rotating fall determining value with the second composite vector value. When the second composite vector value is greater than the rotating fall determining value, the process proceeds to step S9 for determining a rotating fall. When the second composite vector value is smaller than the rotating fall determining value, it is determined that the result in step S3 is caused by an external impact, and the process returns to step S1, so that the control unit 3 waits in the fall watch time waiting state.

In step S9, the control unit 3 retrieves the first and second acceleration components temporarily stored in the storage unit 4, and calculates an angular difference between an angle of acceleration relative to each testing surface upon obtaining the first acceleration component signal and an angle of acceleration relative to each testing surface upon obtaining the second acceleration component signal.

The testing surface is defined as a plane containing two of the three axes. That is, there are three testing surfaces, i.e., an X-Y testing surface containing the X-axis and the Y-axis; an X-Z testing surface containing the X-axis and the Z-axis; and a Y-Z testing surface containing the Y-axis and the Z-axis. An angle of each testing surface, for example, the X-Y testing surface, is determined as a direction of an acceleration vector obtained according to the acceleration component in the X-axis and the acceleration component in the Y-axis. The angular difference is calculated as a variable between the angle (first angle) of the acceleration direction of each testing surface upon obtaining the first acceleration component signal and the angle (second angle) of the acceleration direction of each testing surface upon obtaining the second acceleration component signal.

In step S10, after the control unit 3 calculates the angular difference of each testing surface, the control unit 3 retrieves the angular difference determining value stored in the storage unit 4, and compares the angular difference determining value with the angular difference of each testing surface. When at least one of the angular differences of the testing surfaces is greater than the angular difference determining value, it is determined to be the rotating fall, and the process proceeds to step S15. When all of the angular differences of the testing surfaces are smaller than the angular difference determining value, it is determined to be no rotating fall, and the process returns to step S1, so that the control unit 3 waits in the fall watch time waiting state.

In a state that no external force is applied, i.e., a falling state, once an angular momentum is applied, the angular momentum does not disappear. Accordingly, it is determined to be no rotating fall. When a user swings a mobile device having the fall detection device 1 or a user touches and turns a mobile device having the fall detection device 1 on a desk, it is possible to determine that the mobile device is not falling through the fall detection process described above.

In step S11, after the control unit 3 determines the possibility of the rotating fall, the control unit 3 retrieves the determining time interval stored in the storage unit 4. Then, the control unit 3 waits for a period of the determining time interval while the timing unit 5 measures a lapsed time from when the first acceleration component signal is obtained. After the determining time interval, the process proceeds to step S12. If it is before the determining time interval, the control unit 3 continues waiting.

In step S12, after the determining time interval, the control unit 3 obtains once more an acceleration component signal (third acceleration component signal) in each axis from the three-axial acceleration sensor 2. In step S13, after the control unit 3 obtains the third acceleration component signal in each axis, similar to step S2, the control unit 3 calculates a composite vector value (third composite vector value).

In step S14, after the control unit 3 calculates the third composite vector value, the control unit 3 retrieves the free fall determining value stored in the storage unit 4, and compares the free fall determining value with the third composite vector value. When the third composite vector value is small than the free fall determining value, it is determined to be the free fall, and the process proceeds to step S15. When the third composite vector value is greater than the free fall determining value, it is determined to be no free fall, and the process returns to step S1, so that the control unit 3 waits in the fall watch time waiting state.

In step S15, after the control unit 3 determines the rotating fall or the free fall, the control unit 3 sends the retraction directing signal to the hard disk device 6 as a signal according to the determination result. The fall detection process is executed as described above.

Figure 5:
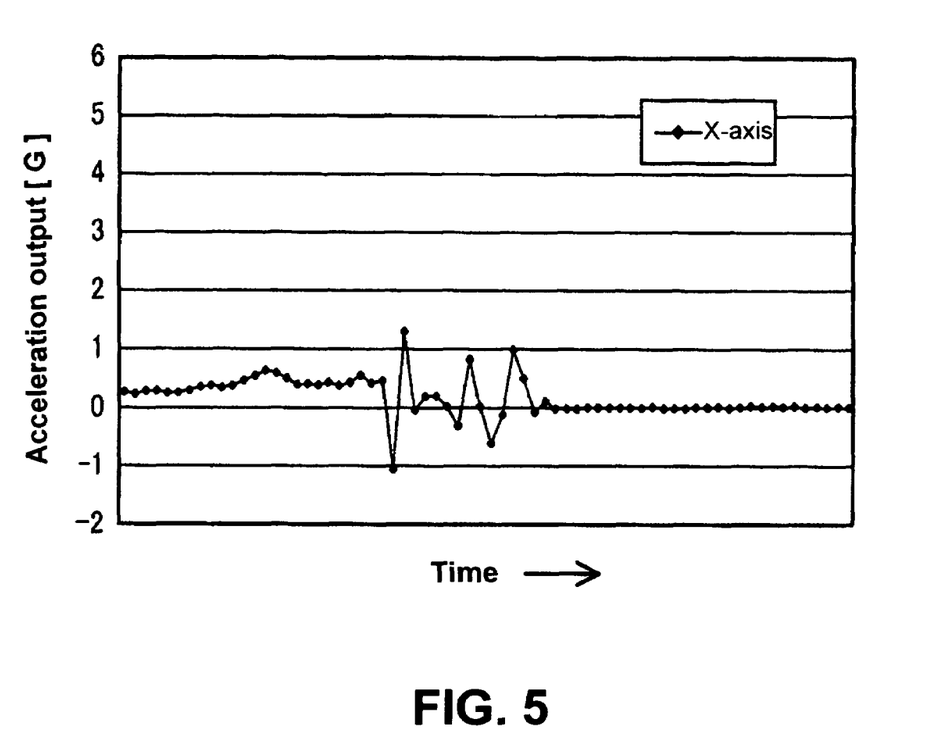
FIG. 5 is a graph showing an example of an acceleration component signal of a three-axial acceleration sensor in an X-axis according to the embodiment of the present invention.
Figure 6:
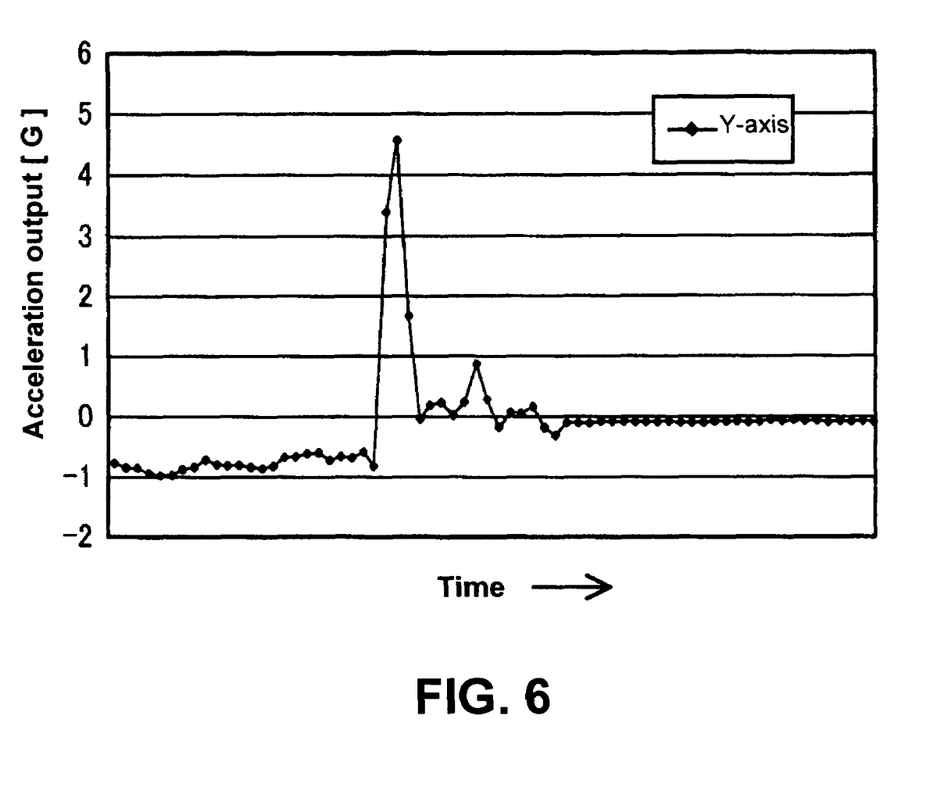
FIG. 6 is a graph showing an example of an acceleration component signal of the three-axial acceleration sensor in a Y-axis according to the embodiment of the present invention.
Figure 7:
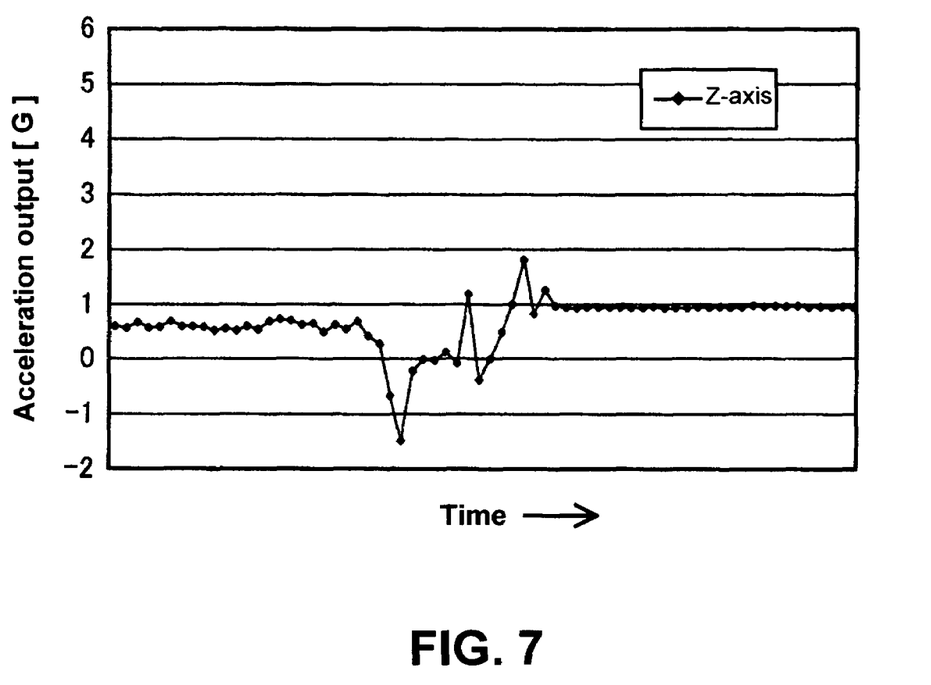
FIG. 7 is a graph showing an example of an acceleration component signal of the three-axial acceleration sensor in a Z-axis according to the embodiment of the present invention.
Figure 8:
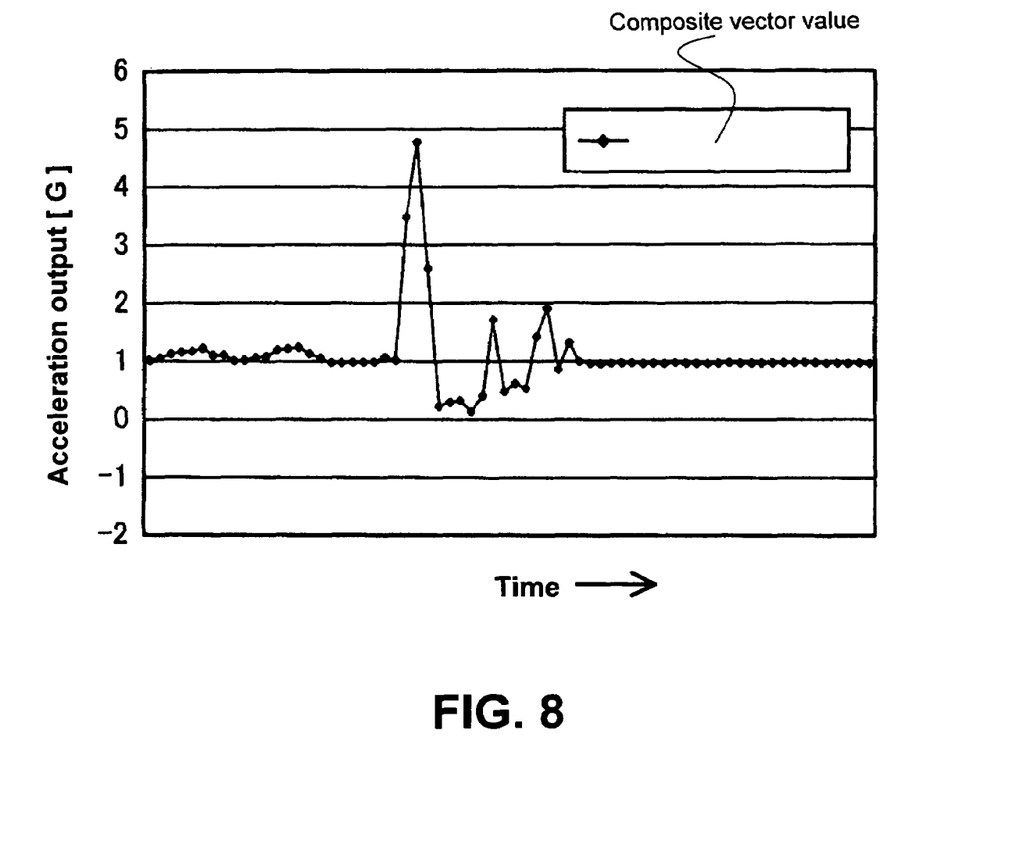
FIG. 8 is a graph showing an example of a composite vector value calculated with the fall detection device according to the embodiment of the present invention.

When a mobile device having the fall detection device 1 falls in the rotating fall state from a stationary state, waveforms of the acceleration element signal in each of the axes and the composite vector value are shown, for example, in FIGS. 5 to 8. FIG. 5 is a graph showing an example of the acceleration component signal of the three-axial acceleration sensor in the X-axis according to the embodiment of the present invention. FIG. 6 is a graph showing an example of the acceleration component signal of the three-axial acceleration sensor in the Y-axis according to the embodiment of the present invention. FIG. 7 is a graph showing an example of the acceleration component signal of the three-axial acceleration sensor in the Z-axis according to the embodiment of the present invention. FIG. 8 is a graph showing an example of the composite vector value calculated with the fall detection device according to the embodiment of the present invention.

The horizontal axes in FIGS. 5 to 8 represent time, and the vertical axes represent a ratio relative to the gravitational acceleration (acceleration output; G). The waveforms are results of an experiment measured when a mobile device was dropped from a height of 1.5 m along the Y-axis while rotating around the Z-axis. In the stationary state before the fall, the acceleration output in the Y-axis was about −1 G (downward) as shown in FIG. 6; the acceleration outputs in the X-axis and the Z-axis were values corresponding to an inclined state as shown in FIGS. 5 and 7; and the composite vector value (absolute value) were about 1 G as shown in FIG. 8.

When the fall started from the stationary state, as shown in FIG. 6, the acceleration element signal in the Y-axis exceeded 1 G in an absolute value (about 4.5 G in FIG. 6) due to the centrifugal force associated with the rotation around the X-axis. At the same time, the acceleration element signals in the X-axis and the Z-axis changed accordingly, and the composite vector value occasionally exceeded 1 G as shown in FIG. 6.

At the end of the rotating fall, the composite vector value exceeded 1 G (about 2 G in FIG. 6) due to an impact when the mobile device hit a floor. After the fall, the mobile device stayed on the floor with the Z-axis upward. Accordingly, the acceleration element signal in the Z-axis (FIG. 7) became 1 G; the acceleration element signals in the X-axis and the Y-axis became 0 G; and the composite vector value became 1 G.

Just before the mobile device hit the floor, the composite vector value became 0 G (FIG. 6), indicating the free fall state. This is because an external force (resistance against the rotation) was applied to the mobile device through a lead wire connected thereto, so that the rotation was stopped in the middle of the fall.

As described above, in the rotating fall detection process, the composite vector value associated with the rotating fall is monitored regularly according to the sampling time. The dynamic state upon falling is determined with the threshold value of 1.3 G. Then, it is determined that the dynamic state continues after the determining time interval with the threshold value of 1.3 G one more time. Further, it is determined to be the rotating fall with the angular difference.

In the fall detection device 1, when the first composite vector value of the first acceleration component obtained from the three-axial acceleration sensor 2 is greater than the rotating fall determining value, or smaller than the free fall determining value, the possibility of the fall is determined. When the second composite vector value of the second acceleration component obtained after the determining time interval is greater than the rotating fall determining value, and the angular difference of each testing surface is greater than the angular difference determining value, it is determined to be in the middle of the fall. Further, when the third composite vector value of the third acceleration component obtained one more time is smaller than the free fall determining value, it is determined to be in the middle of the fall.

In other wards, the start of the dynamic change is detected in the first detection, and it is determined whether it is in the middle of the fall in the second detection after the determining time interval. Accordingly, it is possible to distinguish the fall state from other movements, thereby eliminating misjudgment due to the movements. Therefore, it is possible to improve the accuracy and reliability of the fall detection.

In the embodiment, the fall detection device 1 is formed of the three-axial acceleration sensor 2 and the microcomputer, and it is not necessary to provide any other units. Accordingly, it is possible to reduce a size of the fall detection device 1, thereby reducing a mounting area thereof and a size of a mobile device. Further, the retraction operation in the hard disk becomes less frequent, and an alternate current signal supply source can be eliminated, thereby reducing power consumption of a mobile device.

As described above, when the first composite vector value of the first acceleration component obtained from the three-axial acceleration sensor 2 is greater than the rotating fall determining value, the possibility of the fall is determined. When the second composite vector value of the second acceleration component obtained after the determining time interval is greater than the rotating fall determining value, and the angular difference of each testing surface is greater than the angular difference determining value, it is determined to be in the middle of the fall. Accordingly, it is possible to distinguish the rotating fall state from other movements, thereby eliminating misjudgment due to the movements. As a result, it is possible to improve reliability of the fall detection. Further, the fall detection device 1 is formed of the three-axial acceleration sensor 2 and the microcomputer, and it is not necessary to provide any other units. Accordingly, it is possible to reduce a size of the fall detection device 1.

When the first composite vector value of the first acceleration component obtained from the three-axial acceleration sensor 2 is smaller than the free fall determining value, the possibility of the free fall is determined. When the third composite vector value of the third acceleration component obtained after the determining time interval is smaller than the free fall determining value, it is determined to be in the middle of the free fall. Accordingly, it is possible to distinguish the free fall state from other movements, thereby eliminating misjudgment due to the movements. As a result, it is possible to improve reliability of the fall detection. Further, the fall detection device 1 is formed of the three-axial acceleration sensor 2 and the microcomputer for detecting both of the rotating fall and the free fall. Accordingly, it is possible to reduce a size of the fall detection device 1.

In the embodiment, the determining time interval is set to be the sampling time. Accordingly, even though the determining time interval is not stored in the storage unit 4, it is possible to automatically perform the second detection, thereby reducing load of the storage unit 4 of the fall detection device 1. In the embodiment, the sampling time is 1 msec., and the invention is not limited thereto. The sampling time may be longer or shorter than 1 msec.

The sampling time is set so that it is possible to calculate the composite vector value twice during an expected fall time. Further, the sampling time is set so that it is possible to perform an operation such as the retraction of the magnetic head according to the fall detection after the second composite vector value is calculated and the angular difference is determined. When the sampling time decreases, it is possible to detect the start of the fall quickly, thereby improving accuracy of the fall detection.

In the embodiment, the determining time interval is set to be the sampling time. The invention is not limited thereto, and the determining time interval may be set specifically according to the sampling time and environment. For example, when the sampling time decreases or a low frequency vibration is applied to a mobile device, the determining time interval may be set to be longer considering the end of the second detection, so that it is prevented to measure only one side of a peak of a waveform of the composite vector value, thereby improving accuracy of the fall detection.

In the embodiment, the free fall determining value is set to 0.1 G, and may be set to a value close to 0.1 G or an arbitrary value considering an influence of external noises. Further, the rotating fall determining value is set to 1.3 G, and may be set to a value above 1.0 G or an arbitrary value considering an influence of external noises. Further, the angular difference determining value is set to 40 degrees, and may be set to an arbitrary value considering an angular speed during the fall according to a use state as far as it is possible to determine the rotating fall.

The disclosure of Japanese Patent Application No. 2006-084787, filed on Mar. 27, 2006, is incorporated in the application.

While the invention has been explained with reference to the specific embodiments of the invention, the explanation is illustrative and the invention is limited only by the appended claims.

What is claimed is:

1. A fall detection device comprising:
   a three-axial acceleration sensor for detecting acceleration components in three axes crossing perpendicularly with each other, and for outputting acceleration component signals;
   a first storage unit for storing a rotating fall determining value to determine a rotating fall upon falling, a determining time interval with which the acceleration component signal is obtained again to determine the rotating fall, and an angular difference determining value upon determining the rotating fall;
   a first obtaining unit for obtaining a first acceleration component signal in each of the three axes from the three-axial acceleration sensor;
   a first calculating unit for combining the first acceleration component signal in each of the three axes to calculate a first composite vector value;
   a first reading unit for reading the rotating fall determining value from the first storage unit;
   a first comparing unit for comparing the rotating fall determining value with the first composite vector value;

a second reading unit for reading the determining time interval from the first storage unit when the first composite vector value is grater than the rotating fall determining value;

a second obtaining unit for obtaining a second acceleration component signal in each of the three axes from the three-axial acceleration sensor after the determining time interval;

a second calculating unit for combining the second acceleration component signal in each of the three axes to calculate a second composite vector value;

a second comparing unit for comparing the rotating fall determining value with the second composite vector value;

a third calculating unit for calculating an angular difference between a first angle of each of testing surfaces calculated from the first acceleration component signal in each of the three axes and a second angle of each of the testing surfaces calculated from the second acceleration component signal in each of the three axes when the second composite vector value is greater than the rotating fall determining value;

a third reading unit for reading the angular difference determining value from the first storage unit;

a third comparing unit for comparing the angular difference determining value with the angular difference of each of the testing surfaces;

a first determining unit for determining the rotating fall when at least one of the angular differences of the testing surfaces is greater than the angular difference determining value;

a second storage unit for storing a free fall determining value to determine a free fall upon falling;

a fourth reading unit for reading the free fall determining value from the second storage unit;

a fourth comparing unit for comparing the free fall determining value with the first composite vector value;

a fifth reading unit for reading the determining time interval from the first storage unit when the first composite vector value is smaller than the free fall determining value;

a third obtaining unit for obtaining a third acceleration component signal in each of the three axes from the three-axial acceleration sensor after the determining time interval;

a fourth calculating unit for combining the third acceleration component signal in each of the three axes to calculate a third composite vector value;

a fifth comparing unit for comparing the free fall determining value with the third composite vector value; and a second determining unit for determining the free fall when the third composite vector value is smaller than the free fall determining value.

2. The fall detection device according to claim 1, wherein said determining time interval is set to a sampling time for watching one of the rotating fall and the free fall.

3. A fall detection device comprising:

a three-axial acceleration sensor for detecting acceleration components in three axes crossing perpendicularly with each other, and for outputting acceleration component signals;

a first storage unit for storing a rotating fall determining value to determine a rotating fall upon falling, a determining time interval with which the acceleration component signal is obtained again to determine the rotating fall, and an angular difference determining value upon determining the rotating fall;

a first obtaining unit for obtaining a first acceleration component signal in each of the three axes from the three-axial acceleration sensor;

a first calculating unit for combining the first acceleration component signal in each of the three axes to calculate a first composite vector value;

a first reading unit for reading the rotating fall determining value from the first storage unit;

a first comparing unit for comparing the rotating fall determining value with the first composite vector value;

a second reading unit for reading the determining time interval from the first storage unit when the first composite vector value is greater than the rotating fall determining value;

a second obtaining unit for obtaining a second acceleration component signal in each of the three axes from the three-axial acceleration sensor after the determining time interval;

a second calculating unit for combining the second acceleration component signal in each of the three axes to calculate a second composite vector value;

a second comparing unit for comparing the rotating fall determining value with the second composite vector value;

a third calculating unit for calculating an angular difference between a first angle of each of testing surfaces calculated from the first acceleration component signal in each of the three axes and a second angle of each of the testing surfaces calculated from the second acceleration component signal in each of the three axes when the second composite vector value is greater than the rotating fall determining value;

a third reading unit for reading the angular difference determining value from the first storage unit;

a third comparing unit for comparing the angular difference determining value with the angular difference of each of the testing surfaces;

a first determining unit for determining the rotating fall when at least one of the angular differences of the testing surfaces is greater than the angular difference determining value;

a second storage unit for storing a free fall determining value to determine a free fall upon falling;

a fourth reading unit for reading the free fall determining value from the second storage unit;

a fourth comparing unit for comparing the free fall determining value with the first composite vector value;

a fifth reading unit for reading the determining time interval from the first storage unit when the first composite vector value is smaller than the free fall determining value;

a third obtaining unit for obtaining a third acceleration component signal in each of the three axes from the three-axial acceleration sensor after the determining time interval;

a fourth calculating unit for combining the third acceleration component signal in each of the three axes to calculate a third composite vector value;

a fourth comparing unit for comparing the free fall determining value with the third composite vector value; and a second determining unit for determining the tree fall when the third composite vector value is smaller than the free fall determining value.

4. The fall detection device according to claim 3, wherein said determining time interval is set to a sampling time for watching one of the rotating fall and the free fall.

* * * * *